United States Patent [19]
Kondo et al.

[11] Patent Number: 5,669,848
[45] Date of Patent: Sep. 23, 1997

[54] CONTROL SYSTEM FOR AUTOMATIC TRANSMISSION FOR VEHICLE

[75] Inventors: Noboru Kondo; Kenzo Nishida, both of Saitama, Japan

[73] Assignee: Honda Giken Kogyo Kabushiki Kaisha, Tokyo, Japan

[21] Appl. No.: 594,448

[22] Filed: Jan. 31, 1996

[30] Foreign Application Priority Data

Feb. 1, 1995 [JP] Japan .................. 7-015094

[51] Int. Cl.$^6$ .................. F16H 61/58
[52] U.S. Cl. .................. 477/64; 477/80; 477/904; 192/3.3; 192/3.58
[58] Field of Search .................. 192/3.3, 3.58; 477/62, 64, 80, 133, 136, 141, 168, 169, 174, 904

[56] References Cited

U.S. PATENT DOCUMENTS

| | | | |
|---|---|---|---|
| 4,294,140 | 10/1981 | Iwanaga et al. | 192/3.3 |
| 4,438,665 | 3/1984 | Schmidt | 477/64 |
| 4,512,212 | 4/1985 | Ishikawa | 477/64 |
| 5,035,308 | 7/1991 | Baba et al. | 192/3.3 |
| 5,086,889 | 2/1992 | Nobumoto et al. | 477/904 |
| 5,133,232 | 7/1992 | Kikuchi et al. | 192/3.3 |

FOREIGN PATENT DOCUMENTS 1-54576  11/1989  Japan .

*Primary Examiner*—Charles A. Marmor
*Assistant Examiner*—Sherry Lynn Estremsky
*Attorney, Agent, or Firm*—Armstrong, Westerman, Hattori, McLeland & Naughton

[57] ABSTRACT

In order to prevent an increase in engine noise during a kick-down, a timer is set concurrently with a downshifting. When the throttle opening degree becomes equal to or larger than a threshold value YTHNST by a rapid depression of an accelerator pedal before lapse of a predetermined time, a lock-up clutch of a torque converter is brought into an engaged state, thereby preventing a revolution speed of an engine from rising rapidly in order to alleviate the engine noise. After the throttle opening degree TH becomes smaller than the threshold value YTHNST and the engagement of the lock-up clutch is released, the lock-up clutch is not brought into the engaged state even if the throttle opening degree TH again becomes equal to or larger than the threshold value YTHNST. Also, when the throttle opening degree TH becomes equal to or larger than the threshold value YTHNST after lapse of the predetermined time, the lock-up clutch is not brought into the engaged state.

6 Claims, 8 Drawing Sheets

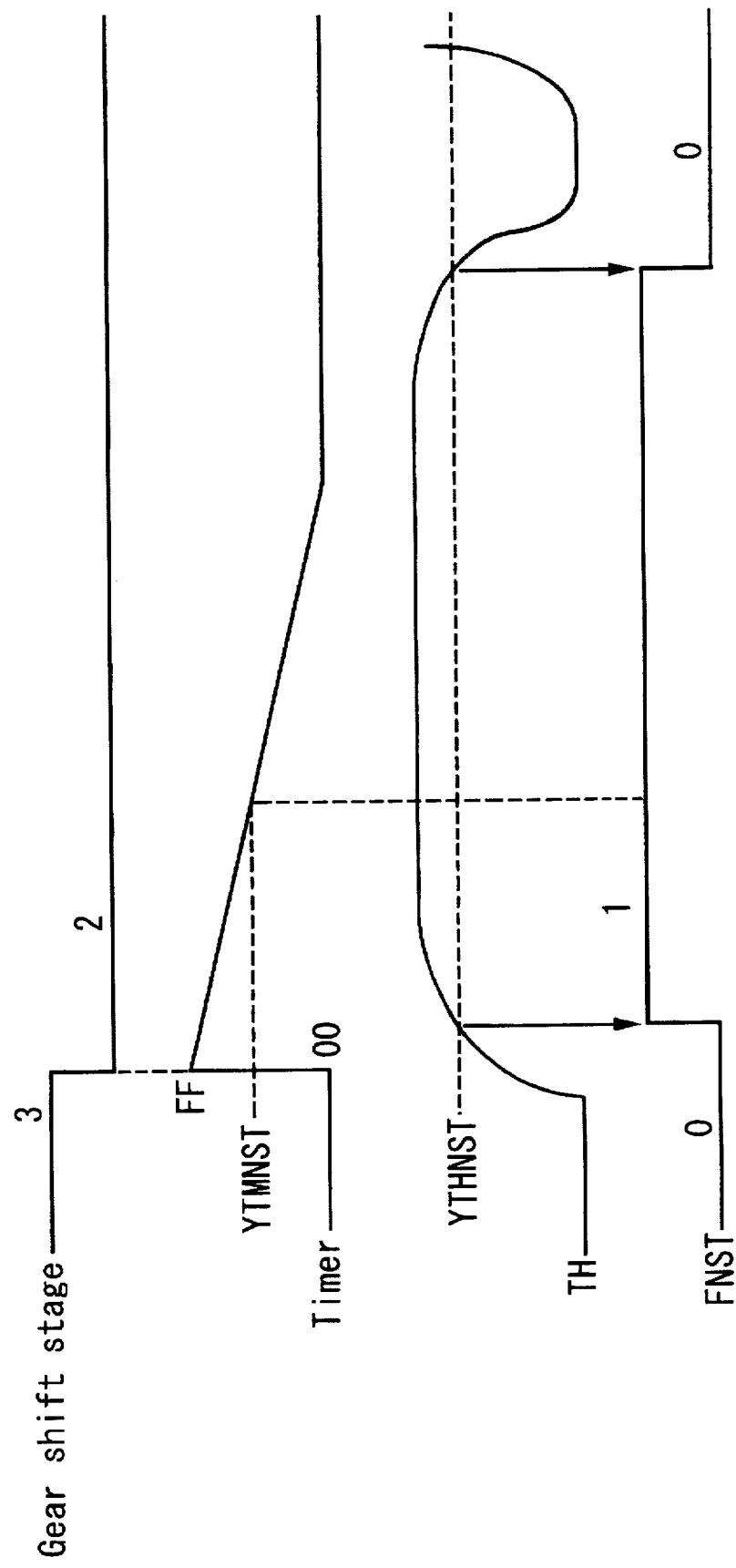

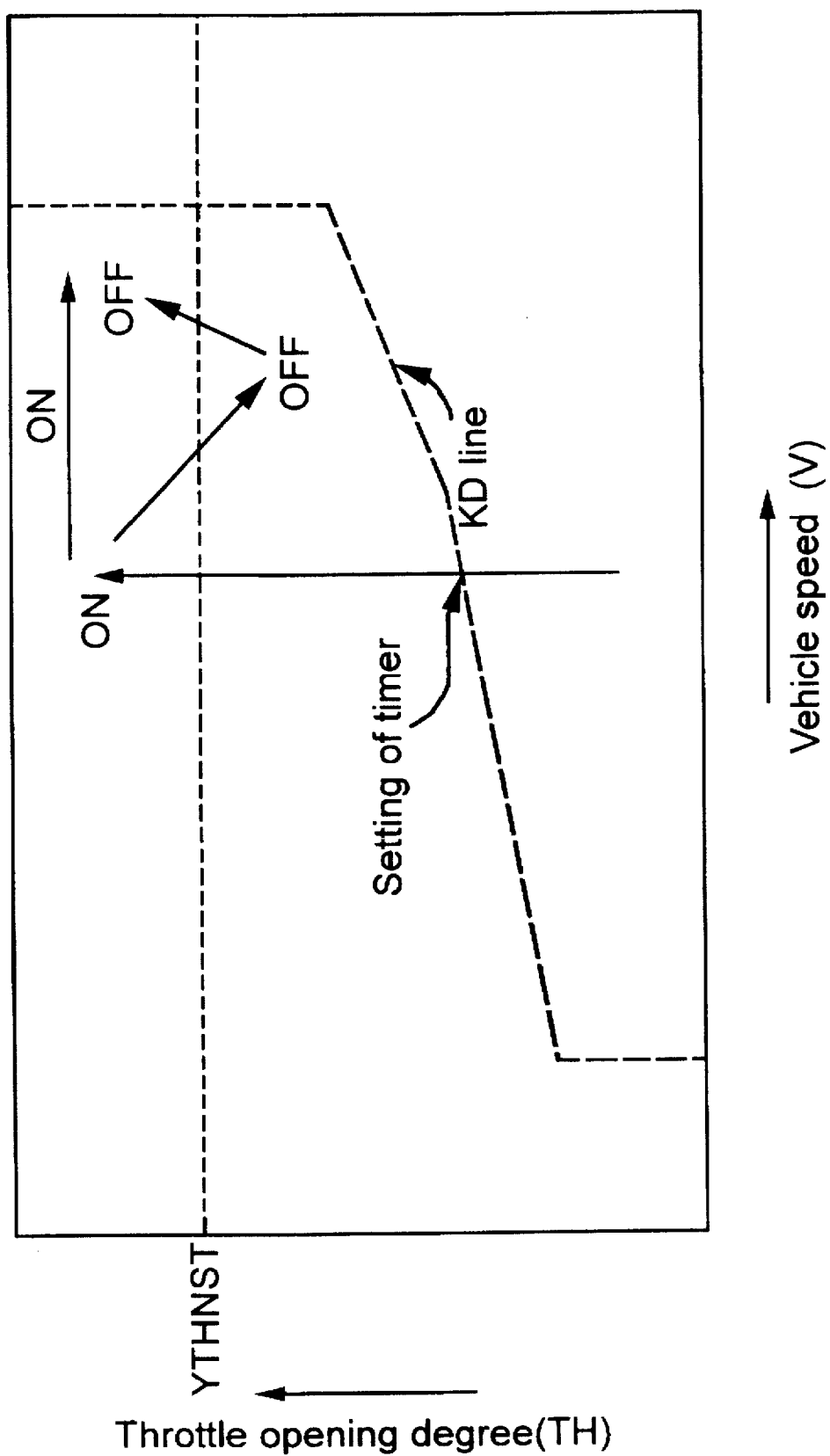

CONTROL SYSTEM FOR AUTOMATIC TRANSMISSION FOR VEHICLE

BACKGROUND OF THE INVENTION

1. Field of the Invention

The present invention relates to a control system for an automatic transmission for a vehicle having a lock-up clutch.

2. Description of the Related Art

There is a conventionally known automatic transmission designed so that an optimal gear shift stage is selected by searching a shifting map using, as parameters, detection values such as a vehicle speed, an engine load and the like, and an automatic shifting operation is conducted to establish such optimal gear shift stage. In general, the automatic transmission includes a fluid torque converter between an engine which is a power source and a shifting mechanism section. During acceleration of the vehicle at the start or during passing, a torque increasing characteristic of the torque converter is efficiently utilized, and during cruising of the vehicle, the lock-up clutch adapted to directly couple or semi-couple the input and output sections of the torque converter is brought into an engaged state to prevent a reduction in efficiency due to fluid transfer.

The known automatic transmission of such type includes one in which, when the shifting is to be conducted, the engagement of the lock-up clutch is released in order to prevent an increase in shifting shock (see Japanese Patent Publication No. 54576/89).

The above known automatic transmissions suffers from the problem described below. During an upshifting or during a downshifting concurrent with the deceleration of the vehicle, no problem arises. However, during a power-on downshifting concurrent with the depression of an accelerator pedal (during a kick-down), an acceleratability is increased by the torque increasing characteristic of the torque converter, but the number of revolutions of the engine is excessively increased, resulting in increased noise to a seat occupant.

The present invention has been accomplished with the above circumstance in view, and it is an object of the present invention to prevent an increase in noise during rapid acceleration of the vehicle.

To achieve the above object of the present invention, there is provided a system for controlling an automatic transmission for a vehicle, comprising a torque converter connected at its input side to an engine and at its output side to a gear shifting mechanism having a plurality of gear shift stages, a lock-up clutch for interconnecting the input and output sides of the torque converter, and a control means for controlling the engagement or disengagement of the lock-up clutch based on at least a value corresponding to an engine load, wherein the control means causes the lock-up clutch to be brought into an engaged state during acceleration of the vehicle.

Alternately, according to another feature of the present invention, the lock-up clutch is brought into a directly coupled state during acceleration of the vehicle.

Alternately, according to another feature of the present invention, the lock-up clutch is brought into a slipping engaged state during acceleration of the vehicle.

According to additional features of the present invention, the time of acceleration of the vehicle is at the time of a driver's power-on operation, i.e. at the time of depression of an accelerator pedal.

According to an additional feature of the present invention, the time of acceleration of the vehicle is the time of commanding of a downshifting by a driver's power-on operation.

According to a further feature of the present invention, the time of acceleration of the vehicle is the time of the increasing of a throttle opening degree to a larger degree than a predetermined value by a driver's power-on operation.

According to still another feature of the present invention, the time of acceleration of the vehicle is the time of the increasing of a throttle opening degree to a larger degree than a predetermined value after commanding of a downshifting by a driver's power-on operation.

According to still another feature of the present invention, the time of acceleration of the vehicle is the time of the increasing of a throttle opening degree to a larger degree than a predetermined value within a predetermined time after commanding of a downshifting by a driver's power-on operation.

According to additional features of the present invention, when the throttle opening degree becomes smaller than the predetermined value after the engagement of the lock-up clutch, as a result of acceleration of the vehicle, the control means releases the engagement of the lock-up clutch, and even if the throttle opening degree becomes equal to or larger than the predetermined value again, the control means maintains the disengaged state of the lock-up clutch.

According to still more additional features of the present invention, the control means starts to bring the lock-up clutch into an engaged state in acceleration of the vehicle before a predetermined time is lapsed from the judgment of a downshifting or after the commanding of a downshifting.

An important function of the instant invention is that the lock-up clutch is brought into the engaged state during acceleration of the vehicle and therefore, a rapid increase in number of revolutions of the engine is prevented to alleviate the noise.

Additionally, another advantage is that when the accelerator opening degree is smaller then the predetermined value after engagement of the lock-up clutch, the engagement of the lock-up clutch is released. Even if the accelerator opening degree again becomes equal to or larger than the predetermined value, the engagement of the lock-up clutch is not released. Therefore, the unnecessary engagement of the lock-up clutch is avoided.

Furthermore, an additional advantage is that when the predetermined time is lapsed from the judgment of the downshifting or from the commanding of the downshifting, the lock-up clutch is not brought into the engaged state, even if the accelerator opening degree becomes equal to or larger than the predetermined value. Therefore, the unnecessary engagement of the lock-up clutch is avoided.

BRIEF DESCRIPTION OF THE DRAWINGS

The present invention will now be described by way of an embodiment with reference to the accompanying drawings.

FIG. 7 is a diagram illustrating a shifting schedule and

FIG. 8 is a graph for explaining the operation.

DETAILED DESCRIPTION OF THE INVENTION

Figure 1:
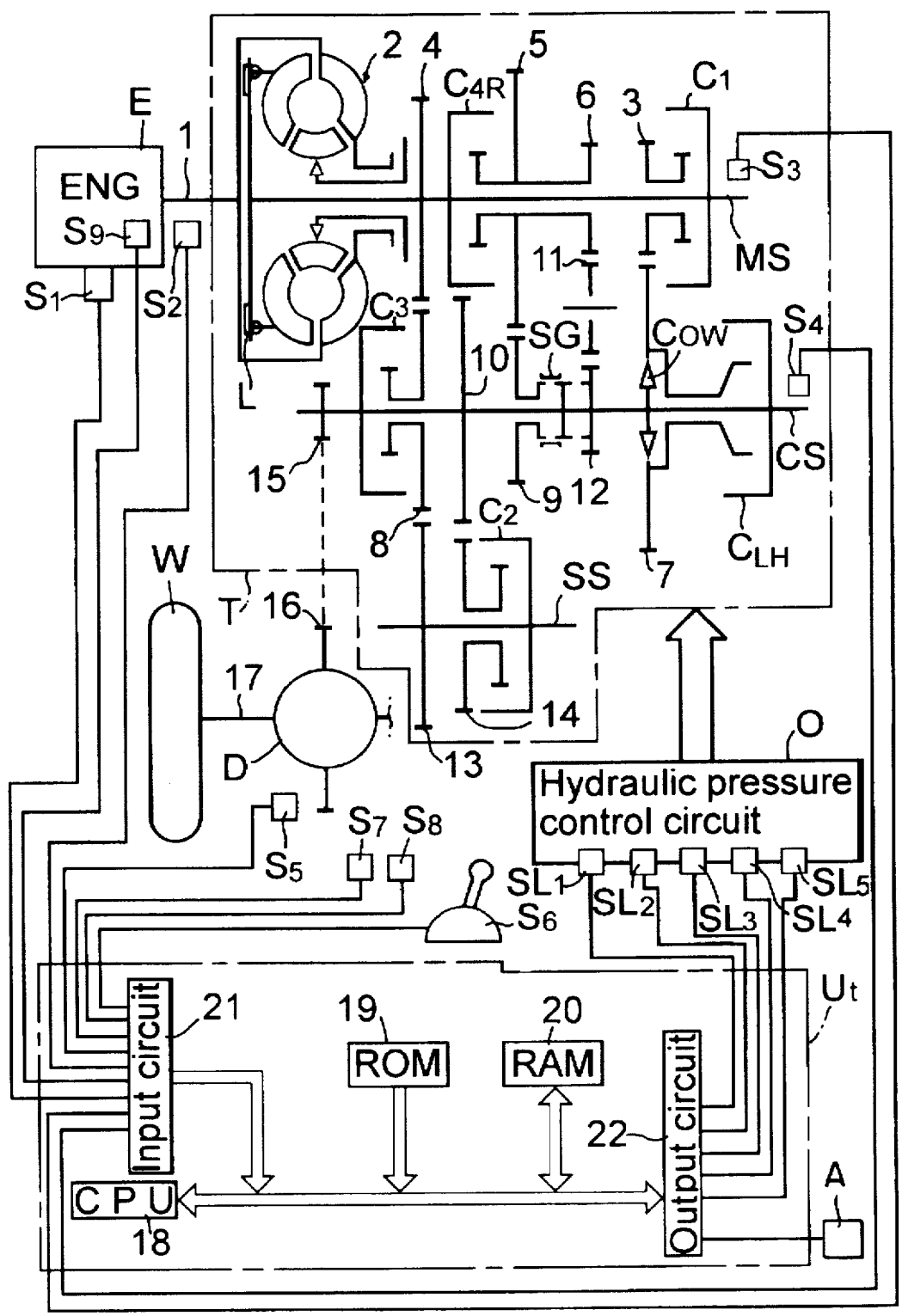
FIG. 1 is a schematic illustration of the entire arrangement of an automatic transmission for a vehicle and a control system for the automatic transmission.

FIG. 1 shows a 7-position type automatic transmission T for a vehicle in which it is possible to select any of the following seven ranges by the select lever: a "P" range, for parking, an "R" range, for reverse, an "N" range, for neutral, a "D" range, for a first- to fourth-shift automatically shiftable range, an "M" range for a first- to fourth-shift manually shiftable range, a "2" range, for a second-shift fixing range including a downshifting from a third gear shift stage to a second gear-shift stage, and a "1" range, for a first-shift fixing range including a downshifting from the second gear-shift stage to a first gear-shift stage.

The automatic transmission T in FIG. 1 includes a main shaft MS, connected to a crankshaft 1, of an engine E, through a torque converter 2, having a lock-up clutch L, and a counter shaft CS and a secondary shaft SS disposed parallel to the main shaft MS.

Carried on the main shaft MS are a main first-shift gear 3 a main second-shift/third-shift gear 4, a main fourth-shift gear 5 and a main reverse gear 6. Carried on the counter shaft CS are a counter first-shift gear 7 meshed with the main first-shift gear 3, a counter second-shift/third-shift gear 8 meshed with the main second-shift/third-shift gear 4, a counter fourth-shift gear 9 meshed with the main fourth-shift gear 5, a counter second-shift gear 10, and a counter reverse gear 12 connected to the main reverse gear 6 through a reverse idle gear 11. Carried on the secondary shaft SS are a first second-shift gear 13 meshed with the counter second-shift/third-shift gear 8, and a second secondary second-shift gear 14 meshed with the counter second-shift gear 10.

When the main first-gear 3, relatively rotatably carried on the main shaft MS, is coupled to the main shaft MS by a first-shift clutch $C_1$, a first gear-shift stage is established. The first-shift clutch $C_1$ is maintained in its engaged state even when any of second to fourth gear-shift stages is established, and hence, the counter first-shift gear 7 is supported through a one-way clutch $C_{ow}$. When the second secondary second-shift gear 14, relatively rotatably carried on the secondary shaft SS, is coupled to the secondary shaft SS, by a second-shift clutch $C_2$, a second gear-shift stage is established. When the counter second-shift/third-shift gear 8, relatively rotatably carried on the counter shaft CS, is coupled to the counter shaft CS by a third-shift clutch $C_3$, a third gear-shift stage is established.

When the main fourth-shift gear 5, relatively rotatably carried on the main shaft MS, is coupled to the main shaft MS by a fourth-shift/reverse clutch $C_{4r}$, in a condition in which the counter fourth-shift gear 9, relatively rotatably carried on the counter shaft CS, has been coupled to the counter shaft CS by a select gear SG, a fourth gear shift stage is established. When the main reverse gear 6, relatively rotatably carried on the main shaft MS, is coupled to the main shaft MS by the fourth-shift/reverse clutch $C_{4r}$, in a condition in which the counter reverse gear 12, relatively rotatably carried on the counter shaft CS, has been coupled to the counter shaft CS by the select gear SG, a reverse gear-shift stage is established.

The rotation of the counter shaft CS is transmitted, through a final drive gear 15 and a final driven gear 16, to a differential D and then, from the differential D, through left and right axles 17, 17, to driven wheels W, W.

Further, when the counter first-shift gear 7 is coupled to the counter shaft CS, by the first-shift holding clutch $C_{LH}$, in a condition in which the first-shift clutch $C_1$ has been brought into its engaged state, a first-shift holding gear shift stage is established. If the first-shift holding gear shift stage is established, when an engine brake is required, the torque of the driven wheels W, W can be transmitted back to the engine E, even if the one-way clutch $C_{ow}$ is slipped.

An electronic control unit Ut, for controlling the automatic transmission T, includes CPU 18, ROM 19, RAM 20, an input circuit 21 and an output circuit 22.

Inputted to the input circuit 21, of the electronic control unit Ut, are a throttle opening degree TH, detected by a throttle opening degree sensor $S_1$ mounted in the engine E, an engine revolution-number Ne, detected by an engine revolution-number sensor $S_2$, mounted in the engine E, a main shaft revolution-number Nm, detected by a main shaft revolution-number sensor $S_3$, mounted on the main shaft MS, a counter shaft revolution-number Nc, detected by a counter shaft revolution-number sensor $S_4$, mounted on the counter shaft CS, a vehicle speed V, detected by a vehicle speed sensor $S_5$, mounted on the differential D, a select lever position P, detected by a select lever position sensor $S_6$, a signal from an upshifting switch $S_7$, which will be described hereinafter, a signal from a downshifting switch $S_8$, which will be described hereinafter, and a cooling-water temperature Tw, detected by a water temperature sensor $S_9$, mounted in the engine E.

The output circuit 22, of the electronic control unit Ut, is connected to five solenoids $SL_1$, $SL_2$, $SL_3$, $SL_4$ and $SL_5$, mounted in a hydraulic pressure control circuit O, to control the operations of the first-shift clutch $C_1$, the second-shift clutch $C_2$, the third-shift clutch $C_3$, the fourth-shift/reverse clutch $C_{4r}$, the first-shift holding clutch $C_{LH}$, the selector gear SG and the lock-up clutch L. The solenoid $SL_1$ governs the turning ON and OFF of the lock-up clutch L. The solenoid $SL_1$ governs the control of the capacity of the lock-up clutch L. The solenoids $SL_3$ and $SL_4$ govern the turning ON and OFF of the first-shift clutch $C_1$, the second-shift clutch $C_2$, the third-shift clutch $C_3$, the fourth-shift/reverse clutch $C_{4r}$ and the first-shift holding clutch $C_{LH}$, as well as the operation of the selector gear SG. The solenoid $SL5$ governs the control of the clutch hydraulic pressure.

Further, an informing means A, such as a buzzer, a lamp, a speaker and the like, for informing the driver, is connected to the output circuit 22 of the electronic control unit Ut.

Figure 2:
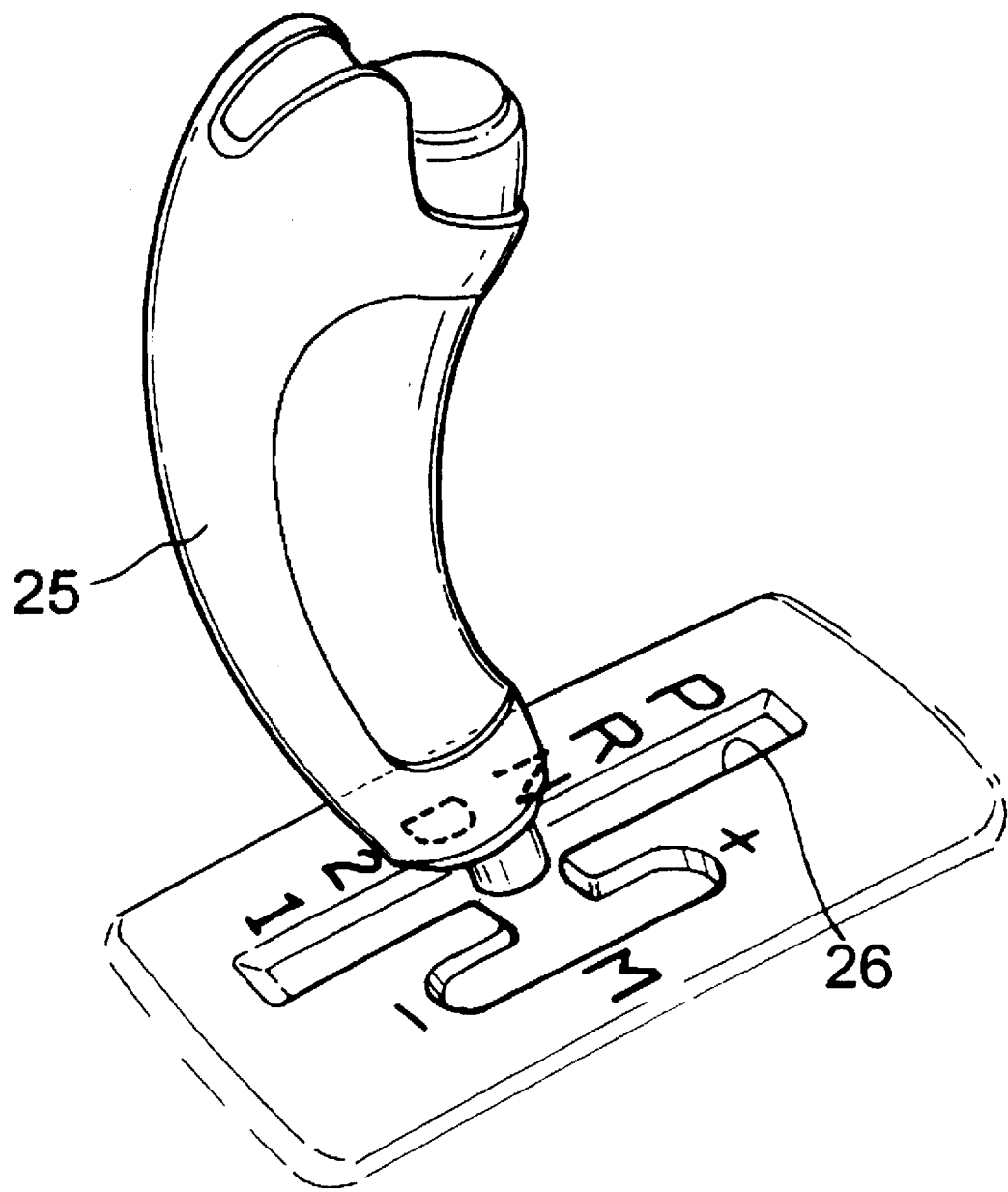
FIG. 2 is a perspective view of a select lever used along with a manual shift lever.

As shown in FIG. 2, the ranges selected by the select lever 25, include the "M" range (the first- to fourth-shift manually shiftable range) in addition to the usual "P", "R", "N", "D", "2" and "1" ranges. A guide groove 26, for guiding the select lever 25, is formed into a substantially H shape. A position, to which the select lever 25 is tilted rightwardly from the "D" range, is the "M" range, where the select lever 25 is tiltable longitudinally. If the select lever 25 is tilted forwardly (in a plus direction) in the "M" range, the upshifting switch S7 is operated, to output an upshifting command. On the other hand, if the select lever 25 is tilted rearwardly (in a minus direction), the downshifting switch S8 is operated to output a downshifting command.

Figure 3:
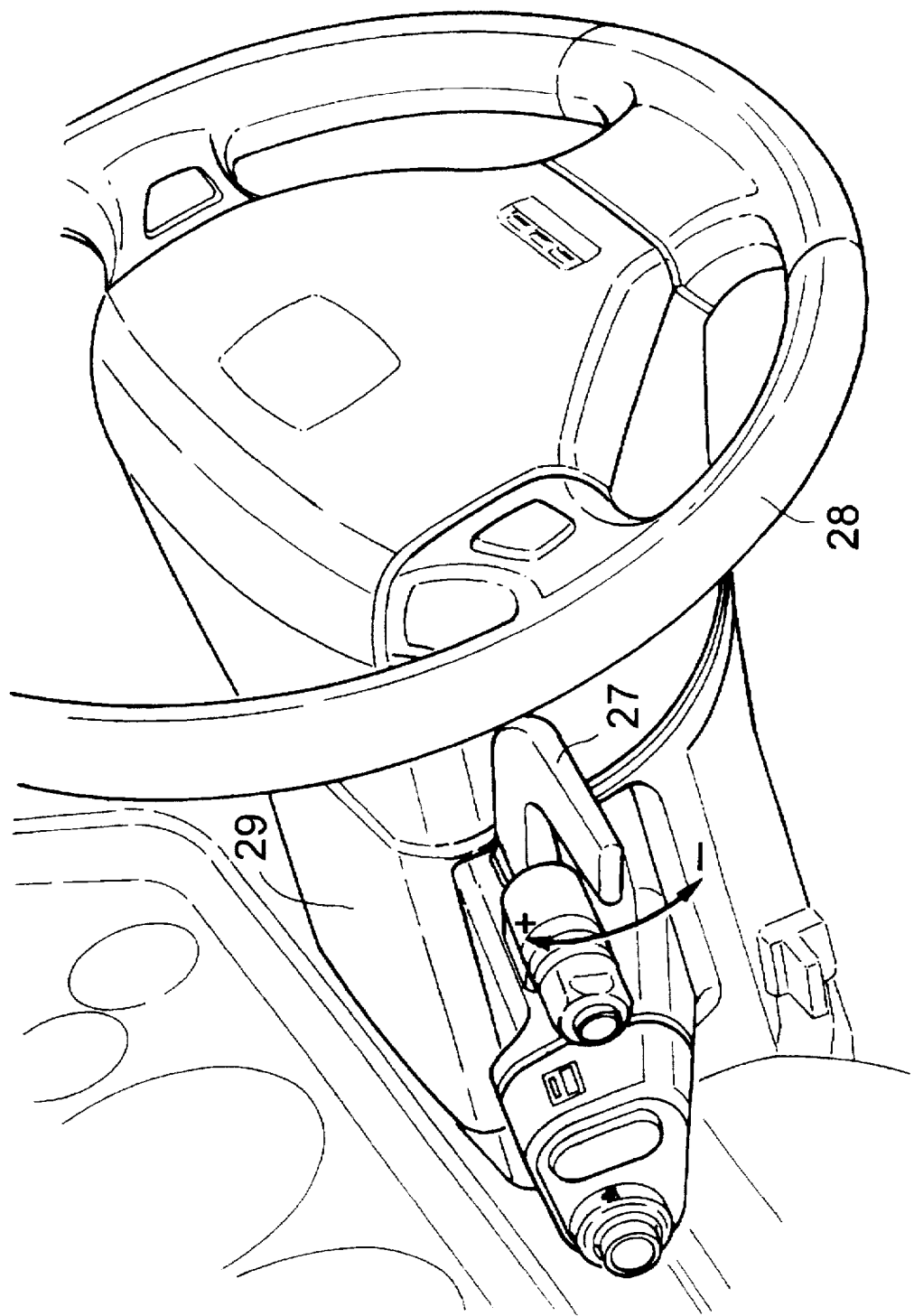
FIG. 3 is a perspective view of the manual shift lever mounted on a steering column.

FIG. 3 shows a manual shift lever 27, mounted independently from the select lever 25. The manual shift lever 27 is vertically swingably mounted on a left side of a steering column 29, which supports a steering wheel 28. The select lever 25 (not shown) has the "M" range between the "D" and "2" ranges. If the manual shift lever 27 is tilted upwardly (in the plus direction) in a condition in which the "M" range has been selected by the select lever 25, the upshifting switch S7 is operated to output the upshifting command. On the other hand, if the manual shift lever 27 is tilted downwardly (in the minus direction), the downshifting switch S8 is operated to output the downshifting command.

Figure 4:
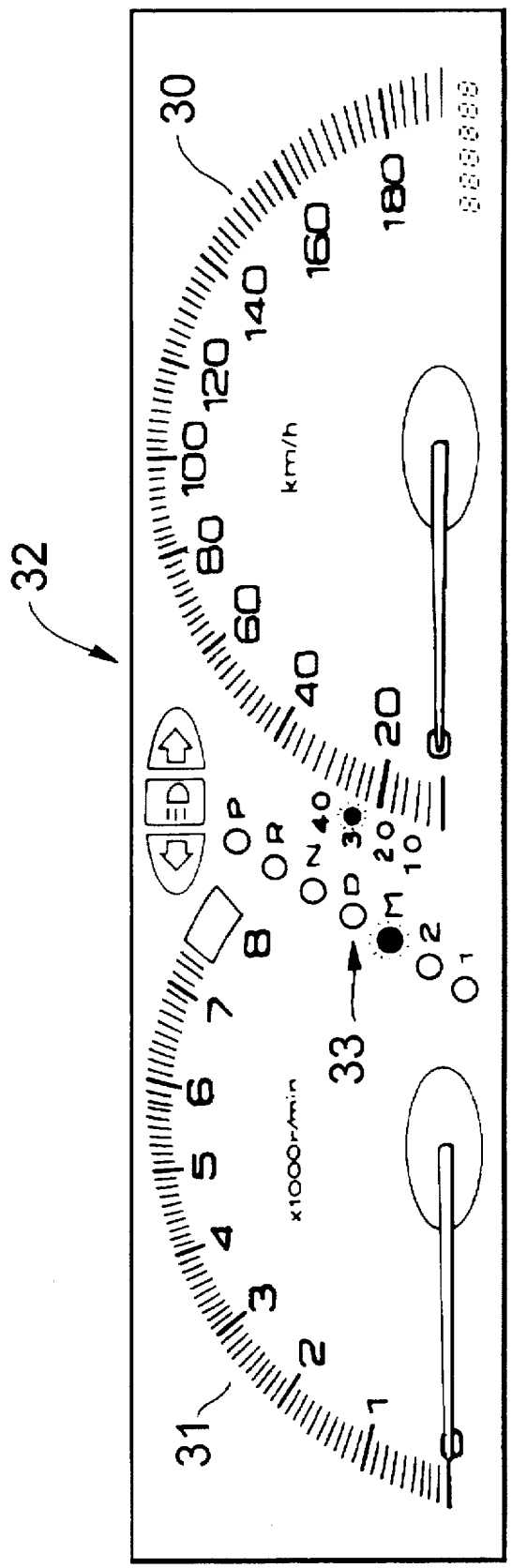
FIG. 4 is an illustration of an indicator for selected positions and gear-shift stages.

A range selected by the select lever 25, FIG. 2, is indicated by an indicator 33, FIG. 4, which is mounted on a meter panel 32 including a speedometer 30 and a tachometer 31, as shown in FIG. 4. When the "M" range is selected, the gear shift stage currently established is indicated by the indicator 33. Alternatively, a range selected by the select lever 25 may be indicated on an indicator 33, provided in a tachometer 31, or the like, as shown in FIG. 5, and when the "M" range is selected, the gear shift stage, currently established, is indicated on the indicator 33.

Figure 5:
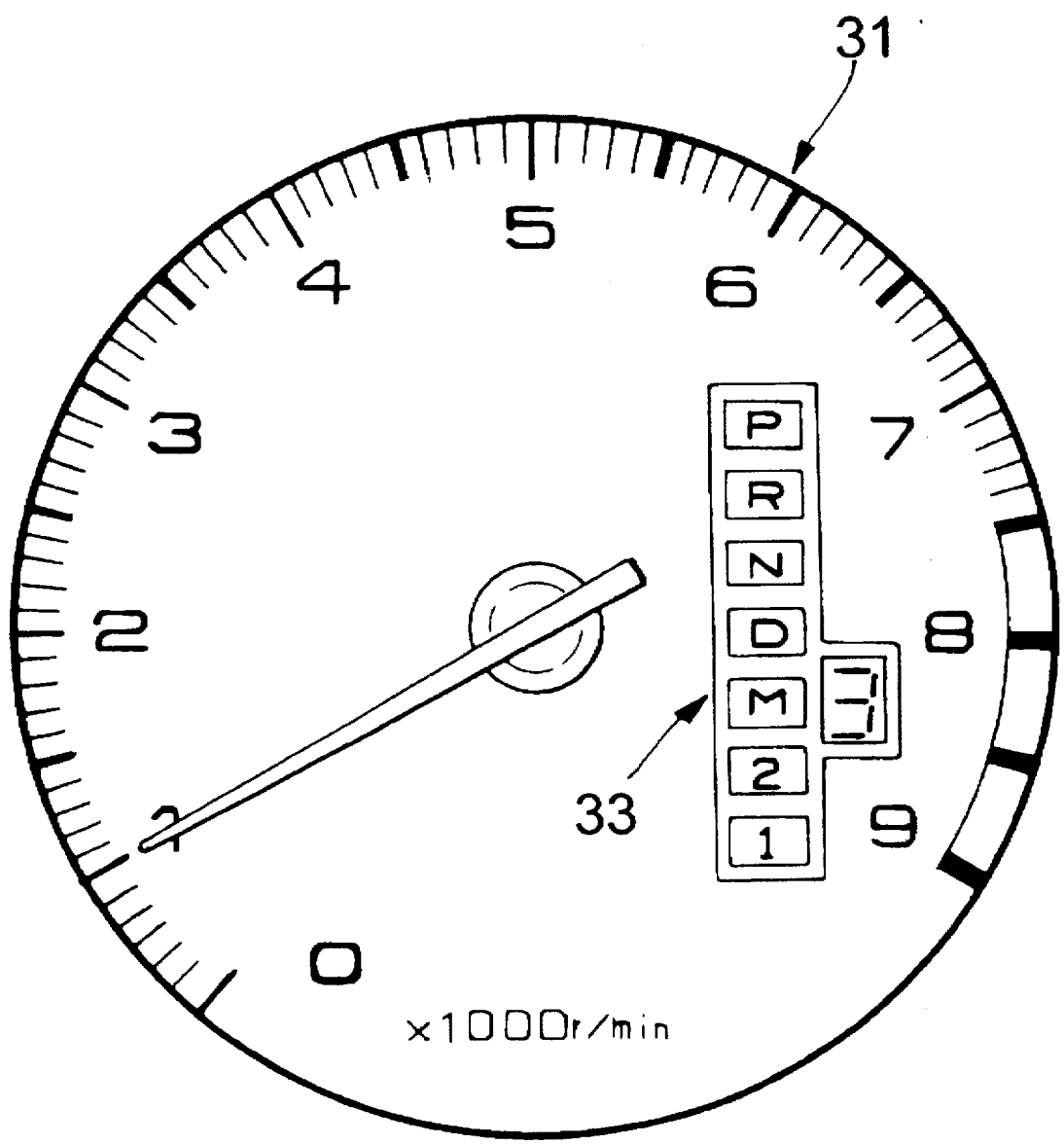
FIG. 5 is an illustration of another example of an indicator for selected positions and gear-shift stages.

In FIGS. 4 and 5, if the indication of the gear shift stage, currently established, is flashed, the visual recognizability is further enhanced. In place of indicating the first-shift to fourth-shift gear shift stages by numerals 1 to 4, respectively, the gear ratio in each of these gear shift stages may be indicated.

When the "D" range has been selected, by the select lever 25, the upshifting and downshifting, between the first-shift to fourth-shift gear shift stages, are automatically carried out based on a shift map using, as parameters, the vehicle speed V, detected by the vehicle speed sensor S5 and the throttle opening degree TH, detected by the throttle opening degree sensor $S_1$. When the "2" range is selected, the second gear shift stage is established. However, if the vehicle speed provided upon selection of the "2" range is large, so that an over revolution occurs in the second gear shift stage, the third gear shift stage is first established, and after the vehicle speed is reduced, the third gear shift stage is downshifted to the second gear shift stage which is then fixed. Similarly, if the vehicle speed provided upon selection of the "1" range is large, so that an over revolution occurs in the first-shift holding gear shift stage, the second gear shift stage is first established, and after the vehicle speed is reduced, the second gear shift stage is downshifted to the first-shift holding gear shift stage which is then fixed.

When the range has been switched over from the "D" range to the "M" range, if the gear shift stage in the "D" range, before the switching-over, is any of the first to third gear shift stages, the same gear shift stage is held in the "M" range after the switching-over. If the gear shift stage in the "D" range, before the switching-over, is the fourth gear shift stage, the third gear shift stage is established in the "M" range, after the switching-over. However, if an over revolution occurs, upon the establishment of the third gear shift stage, the fourth gear shift stage is established.

When the range has been switched over from the "2" range to the "M" range, even if the gear shift stage in the "2" range, before the switching-over, is any of the third and second gear shift stages, the third gear shift stage is established in the "M" range, after the switching-over. However, when the range has been switched over from the "2" range to the "M" range, during stoppage of the vehicle, the first gear shift stage is established in the "M" range, after the switching-over.

Further, by operating the upshifting switch $S_7$, or the downshifting switch $S_8$, during stoppage of the vehicle, the first or second gear shift stage can be selected as a gear shift stage at the start of the vehicle.

Figure 6:
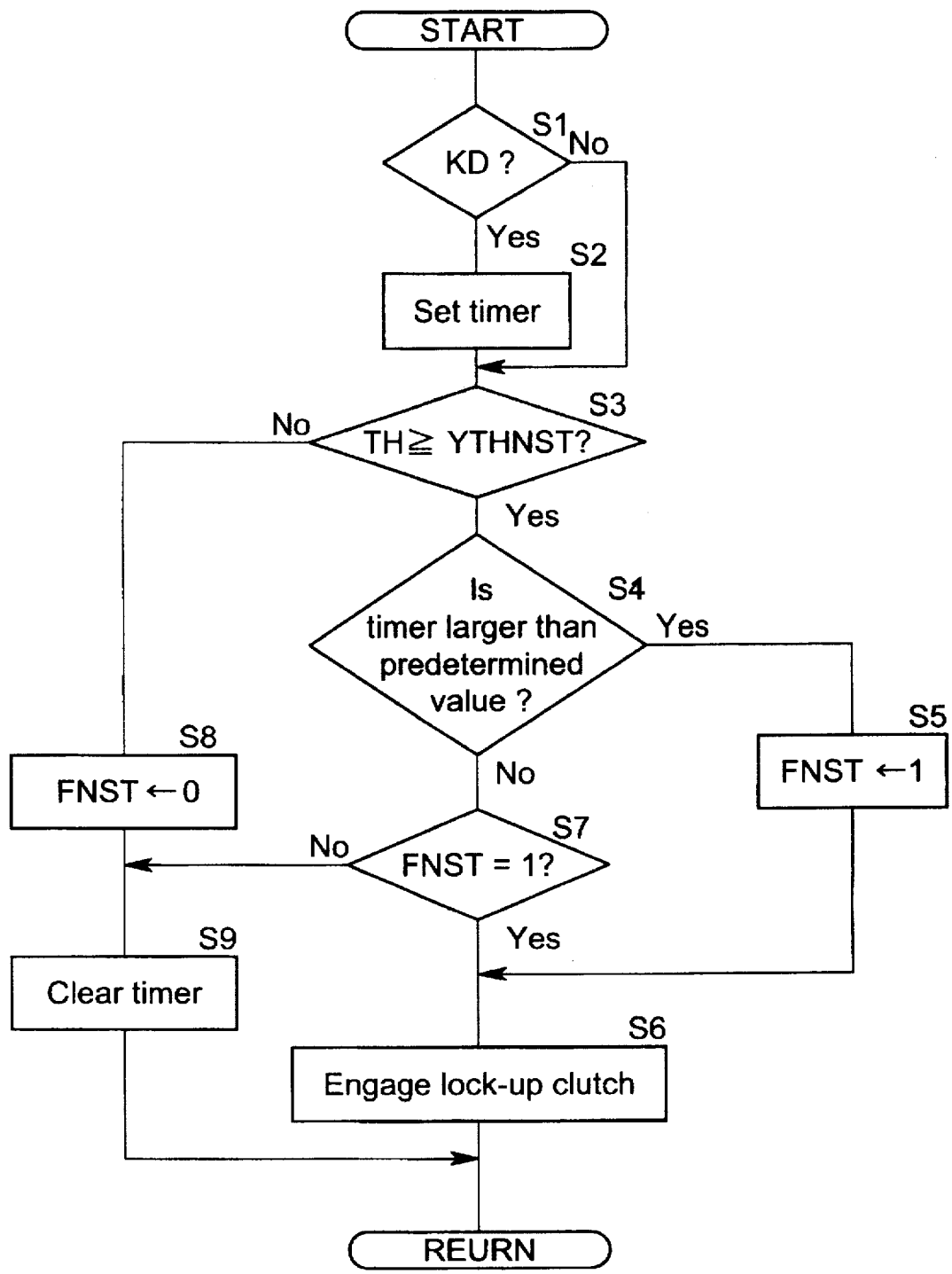
FIG. 6 is a flow chart for explaining the operation.

The control of the lock-up clutch L of the torque converter 2 during kick-down will be described below with reference to the flow chart in FIG. 6. As used therein, the term "during kick-down" is limited to a case where the electronic control unit Ut has automatically output a downshifting command by rapid depression of the accelerator pedal in the "D" range.

First, when the downshifting command is output due to kick-down (at step S1), a timer, for sequentially subtracting a given value corresponding to a lapse of time, is set (at step S2). Then, if the throttle opening degree TH detected by the throttle opening degree sensor S1 is equal to or larger than a threshold value YTHNST (e.g., ⅝ throttle opening degree) (at step S3), and if the timer is equal to or larger then a predetermined value YTMNST (at step S4), a flag FNST is set at "1" (at step S5), and the lock-up clutch L is brought into an engaged state (at step S6). In other words, when the accelerator pedal is rapidly depressed within a predetermined time subsequently to the downshifting, the lock-up clutch L is brought into the engaged state to directly connect the crankshaft of the engine E to the gear shifting mechanism of the automatic transmission T.

When the lock-up clutch L is brought into the engaged state during downshifting in this manner by depression of the accelerator pedal, the load of the engine E is increased to prevent a rapid increase in number of revolutions of the engine (engine speed) and hence, it is possible to alleviate the noise. If the lock-up clutch L is brought into the engaged state during shifting, the shifting shock is increased, as compared with the case where the lock-up clutch L is not brought into the engaged state. However, in kick-down, the accelerator pedal has been depressed to a large extent to provide a large engine output and hence, no small shifting shock is generated. The variation in magnitude of the shifting shock depending upon the engaged state of the lock-up clutch L is relatively small, as compared with the magnitude of the shifting shock in the kick-down, and an increase in shifting shock due to the engagement of the lock-up clutch L is negligible. Therefore, according to the present invention, it is possible to alleviate the noise in kick-down in exchange for a negligible slight increase in shifting shock.

Thereafter, as long as the throttle opening degree TH is maintained at a level equal to or larger than the threshold value YTHNST, even if the timer reaches a value lower than the predetermined value YTMNST at step S4, the lock-up clutch L is maintained in the engaged state, because the flag has already been set at "1" at step S7.

On the other hand, if the throttle opening degree TH is smaller than the threshold value YTHNST as a result of returning of the accelerator pedal after the engagement of the lock-up clutch L, the flag FNST is reset at "0", whereby engagement of the lock-up clutch L is released (at step S8) and the timer is cleared (at step S9). Once the throttle opening degree TH becomes smaller than the threshold value YTHNST, even if the throttle opening degree TH is thereafter increased to a larger degree than the threshold value YTHNST, the lock-up clutch L cannot be brought into the re-engaged state, because the flag FNST has already been set at "0" at step S8. Thus, it is possible to prevent the unnecessary engagement of the lock-up clutch L after the completion of kick-down.

The contents of the above-described flow chart will be described with reference to FIGS. 7 and 8, taking an example of the case of kicking-down from the third gear shift stage to the second gear shift stage.

A kick-down line is established in FIG. 8 by the vehicle speed V on the axis of abscissas and the throttle opening degree TH on the axis of ordinates. When the throttle opening degree TH crosses the kick-down line by rapid depression of the accelerator pedal at a predetermined vehicle speed V in the "D" range, the downshifting command is output. The timer is set concurrently with the delivery of the down shifting command. When the throttle opening degree TH becomes equal to or larger than the threshold value YTHNST while the timer is equal to or larger than the predetermined value YTMNST, the flag FNST is set at "1", and the lock-up clutch L is brought into the engaged state. If the throttle opening degree TH is smaller than the threshold value YTHNST after the engagement of the lock-up clutch L, the flag FNST is reset, and the engagement of the lock-up clutch is released. Thereafter, even if the throttle opening degree TH becomes equal to or larger than the threshold value YTHNST again, the lock-up clutch L is not brought into the engaged state.

Although the embodiment of the present invention has been described in detail, it will be understood that the present invention is not limited to the above-described embodiment, and various modifications may be made without departing from the spirit and scope of the invention defined in the claims.

For example, the engagement of the lock-up clutch L is not limited to the directly connected state free of slipping, and includes a slipping engaged stage. Although the engagement of the lock-up clutch L has been controlled based on both the downshifting command and the accelerator opening degree in the embodiment, such engagement may be controlled based on one of the downshifting command and the accelerator opening degree. In addition, in place of setting of the timer concurrently with the downshifting command, the timer may be set concurrently with the judgment of the downshifting performed in the electronic control unit Ut.

As discussed above, according to features of the present invention, the lock-up clutch is brought into the engaged state at the time of acceleration of the vehicle and therefore, the rapid increase in number of revolutions of the engine (engine speed) is prevented to alleviate the noise.

According to another feature of the present invention, when the accelerator opening degree is smaller than the predetermined value after the engagement of the lock-up clutch, and the engagement of the lock-up clutch is then released, the lock-up clutch is not brought into the engaged state, even if the accelerator opening degree again becomes equal to or larger than the predetermined value. Therefore, the unnecessary engagement of the lock-up clutch is avoided.

We claim:

1. A control system for an automatic transmission for a vehicle, comprising:

a torque converter connected at its input side to an engine and at its output side to a gear shifting mechanism having a plurality of gear shift stages;

a lock-up clutch for interconnecting said input and output sides of said torque converter; and a control means for controlling the engagement and disengagement of said lock-up clutch based on at least a value corresponding to an engine load, wherein said control means causes said lock-up clutch to be brought into an engaged state during acceleration of the vehicle, wherein said acceleration of the vehicle is a time of increasing of a throttle opening degree to a degree larger than a predetermined value after commanding of a downshifting by a depressing operation of an accelerator pedal.

2. A control system for an automatic transmission for a vehicle according to claim 1, wherein said lock-up clutch is brought into a directly coupled state during acceleration of the vehicle.

3. A control system for an automatic transmission for a vehicle according to claim 1, wherein said lock-up clutch is brought into a slipping engaged state during acceleration of the vehicle.

4. A control system for an automatic transmission for a vehicle according to claim 1, wherein said increasing of the throttle opening degree to the degree larger than the predetermined value occurs within a predetermined time after commanding of the downshifting by the accelerator pedal depressing operation.

5. A control system for an automatic transmission for a vehicle according to claim 1 or 4, wherein when the throttle opening degree becomes smaller than said predetermined value after the engagement of the lock-up clutch as a result of acceleration of the vehicle, said control means releases the engagement of the lock-up clutch, and, even if the throttle opening degree becomes equal to or larger than said predetermined value again, said control means maintains the disengaged state of the lock-up clutch.

6. A control system for an automatic transmission for a vehicle according to claims 1 or 4, wherein said control means starts to bring the lock-up clutch into an engaged state in acceleration of the vehicle, before a predetermined time is lapsed from the judgement of a downshifting or the commanding of a downshifting.

* * * * *